(12) United States Patent
Bregman et al.

(10) Patent No.: US 8,789,132 B2
(45) Date of Patent: Jul. 22, 2014

(54) ENTERPRISE MODEL FOR PROVISIONING FINE-GRAINED ACCESS CONTROL

(75) Inventors: Josh Bregman, Acton, MA (US); Michael Khalandovsky, Andover, MA (US)

(73) Assignee: Oracle International Corporation, Redwood Shores, CA (US)

(*) Notice: Subject to any disclaimer, the term of this patent is extended or adjusted under 35 U.S.C. 154(b) by 634 days.

(21) Appl. No.: 12/795,263

(22) Filed: Jun. 7, 2010

(65) Prior Publication Data

US 2011/0302622 A1  Dec. 8, 2011

(51) Int. Cl.
*G06F 21/00* (2013.01)
*G06F 21/62* (2013.01)

(52) U.S. Cl.
CPC .... *G06F 21/6218* (2013.01); *G06F 2221/2141* (2013.01)
USPC ........... 726/1; 726/7; 726/26; 726/27; 726/28

(58) Field of Classification Search
CPC ..................... G06F 21/6218; G06F 2221/2141
USPC ............................................. 726/1; 713/201
See application file for complete search history.

(56) References Cited

U.S. PATENT DOCUMENTS

| | | | |
|---|---|---|---|
| 6,023,765 A | 2/2000 | Kuhn | |
| 6,947,989 B2 | 9/2005 | Gullotta et al. | |
| 7,350,226 B2 | 3/2008 | Moriconi et al. | |
| 7,478,422 B2 | 1/2009 | Valente et al. | |
| 7,483,908 B2 | 1/2009 | Seliger et al. | |
| 7,596,803 B1 | 9/2009 | Barto et al. | |
| 7,650,505 B1 | 1/2010 | Masurkar et al. | |
| 7,653,930 B2 | 1/2010 | Griffin et al. | |
| 7,657,942 B2 | 2/2010 | Himberger et al. | |
| 7,673,323 B1* | 3/2010 | Moriconi ........................ | 726/1 |
| 8,117,640 B1* | 2/2012 | Moriconi et al. .................. | 726/1 |
| 8,381,306 B2* | 2/2013 | McPherson et al. ............ | 726/27 |
| 2002/0157023 A1* | 10/2002 | Callahan et al. .............. | 713/201 |
| 2002/0178119 A1 | 11/2002 | Griffin et al. | |
| 2004/0098594 A1 | 5/2004 | Fleming et al. | |
| 2007/0056019 A1* | 3/2007 | Allen et al. ........................ | 726/1 |
| 2008/0104695 A1* | 5/2008 | Fassino et al. ................... | 726/17 |
| 2009/0260056 A1* | 10/2009 | Garg et al. ......................... | 726/1 |

OTHER PUBLICATIONS

"Windows Authorization Manager";http://msdn.microsoft.com/en-us/library/bb897401.aspx; microsoft, 2008.*
"Task-role-based access control model"; Park et al; Information system 2003, pp. 533-562.*
Ramaswamy Chandramouli, Computer Security Division, "Specification and Validation of Enterprise Access Control Data for Conformance to Model and Policy Constraints", pp. 1-6, http://csrc.nist.gov/groups/SNS/rbac/ documents/xml_admin/Access_control_data_spec_validate.pdf.
McAfee, "Access Control and User Monitoring", pp. 1-2, http://www.mcafee.com/us/enterprise/solutions/network_protection/access_control_and_user_monitoring.html.

(Continued)

*Primary Examiner* — Jason Lee
(74) *Attorney, Agent, or Firm* — Miles & Stockbridge P.C.

(57) ABSTRACT

Access control rules can be defined for target applications of an enterprise system independent of a runtime of the target applications. The access control rules can then normalized into decision tables. These decision tables can then be used to reconcile authorization information with the target applications via user provisioning. This process can enable comprehensive reporting and analysis of enterprise access control rules without requiring direct integration of the target applications at runtime.

20 Claims, 10 Drawing Sheets

(56) References Cited

OTHER PUBLICATIONS

SAP, "SAP BusinessObjects Access Control Features and Functions", http://www.sap.com/solutions/sapbusinessobjects/large/governance-risk-compliance/accessandauthorization/featuresfunctions/index.epx.

Virtual Enterprise Access Control Requirements, Abstract, http://portal.acm.org/citation.cfm?id=954045.

CA, "CA Access Control", pp. 1-2, http://www.ca.com/us/access-control.aspx.

Oracle, "Oracle Entitlements Server; An Oracle White Paper", Sep. 2008, pp. 1-14, http://www.oracle.com/technology/products/id_mgmt/oes/pdf/oes_entitlements.pdf.

Oracle, "Developers and Identity Services—Modernizing Access Control with Authorization Service; An Oracle White Paper", Nov. 2008, pp. 1-14, http://www.oracle.com/technology/products/id_mgmt/pdf/modernizing_access_control_with_authorization_service.pdf.

Oracle, "Oracle Entitlements Server", pp. 1-4, http://www.oracle.com/products/middleware/identity-management/docs/entitlements-server-datasheet.pdf.

Oasis, "eXtensible Access Control Markup Language (XACML); Version 2.0", Feb. 1, 2005, pp. 1-141, http://docs.oasis-open.org/xacml/2.0/access_control-xacml-2.0-core-spec-os.pdf.

Oracle, "Oracle Identity Manager; An Oracle White Paper", pp. 1-14, Dec. 2008, http://www.oracle.com/technology/products/id_mgmt/oxp/pdf/identity_manager_wp_10gr3.pdf.

Oracle, "Oracle Identity Manager Architecture; An Oracle White Paper", May 2006, pp. 1-28, http://www.oracle.com/technology/products/id_mgmt/oxp/pdf/final%20-%20oracle%20identity%20manager%20architecture%20whitepaper%2010gr3v3.pdf.

Oracle, "Oracle Identity Manger", pp. 1-4, http://www.oracle.com/technology/products/id_mgmt/oxp/pdf/identity_manager_ds_10gr3.pdf.

OASIS, "OASIS Service Provisioning Markup Language (SPML); Version 2", Apr. 1, 2006, pp. 1-190.

\* cited by examiner

| Subject | Resource | Action | Context | Decision |
|---|---|---|---|---|
| User 1 | Resource 1 | Read | WEEKDAY = YES | YES |
| User 1 | Resource 1 | Read | WEEKDAY = NO | NO |
| User 2 | Resource 2 | Write | ADMIN (USER 2) = YES | YES |
| User 2 | Resource 2 | Execute | SUPERUSER (USER 2) = YES | YES |
| User 3 | Resource 3 | Delete | ALL | NO |

Fig. 4

ENTERPRISE MODEL FOR PROVISIONING FINE-GRAINED ACCESS CONTROL

FIELD

One embodiment is directed to a computer system for access control, and more particularly, to a computer system for access control policy administration.

BACKGROUND

Access control involves enabling an authority to control access to application resources in a computer system. Access control includes authentication, authorization, and auditing. Authentication involves determining whether a user can log in to a computer system. Authorization involves determining which application resources a user can access once logged in to a computer system, and what is the user's level of access for each application resource. Auditing involves recording important events for future analysis.

In general, computer systems involve many different applications. Each application has its own entitlements (i.e., sets of privileges that govern what a user is authorized to access). Thus, a key component of authorization is managing security for each application. With respect to authorization, there is a wide range of authorization levels, ranging from coarse-grained authorization to fine-grained authorization. Coarse-grained authorization is a simple mechanism to manage whether a user has the necessary permission to access a particular application, such as whether the user is a member of a particular group. In contrast, fine-grained authorization is a more precise mechanism to manage whether a user has the necessary permission to perform a certain action, on a resource of an application. Because fine-grained authorization is more precise than coarse-grained authorization, fine-grained authorization has more context than coarse-grained authorization. Context is defined as attributes of a subject, resource, action, or environment, that can be relevant in making a fine-grained authorization decision. With the increased complexity of today's computer systems, fine-grained authorization is generally becoming the norm in enterprise applications.

In general, a user accesses an application's presentation tier via a web server. Behind the web server, generally, is an application server which manages the application. While web-based authorization policies are typically configured outside of the application server, many application-based authorization policies are "hard-coded" into the application logic itself. An approach where application logic makes authorization decisions generally means that the authorization decisions are not centrally managed, governed, or controlled by a security team that is separate from the application. Furthermore, runtime authorization decisions are rarely audited by the application. In today's enterprise application environment, this approach is no longer feasible. Laws like Sarbanes-Oxley mandate documented controls on who can access information systems that affect the finances of publicly held companies. Healthcare and privacy laws have also placed stricter requirements on access to application resources and auditing of that access. A rapid rise in the outsourcing of application development, had led to a result where authorization logic hard-coded in the application is no longer directly controlled by the enterprise. Thus, changes in the regulatory and development environments has mandated a change in how application-level authorization is managed.

SUMMARY

One embodiment of the invention is directed to a computer-readable medium having instructions stored thereon that, when executed by a processor, cause the processor to perform a method. The instructions include modeling an authorization policy set, and storing the authorization policy set in a policy store. The instructions further include applying the stored authorization policy set to an input of an application to generate an authorization decision set independent of a runtime of the application, and storing the authorization decision set in a decision table. The instructions further include propagating the stored authorization decision set to the application using a user provisioning system.

BRIEF DESCRIPTION OF THE DRAWINGS

Further embodiments, details, advantages, and modifications will become apparent from the following detailed description of the preferred embodiments, which is to be taken in conjunction with the accompanying drawings.

FIG. 4 illustrates a decision table configured to hold authorization decisions according to an embodiment of the invention.

DETAILED DESCRIPTION

According to one embodiment of the invention, authorization decisions for target applications of an enterprise system can be defined independent of whether target applications are currently running. The authorization decisions are then normalized into decision tables, and can then be used to reconcile authorization information with the target applications via user provisioning. Thus, target applications do not need to be modified to be integrated with a central fine-grained authorization management system so that the target applications call the central fine-grained authorization management system at runtime.

One approach to changing how application-level authorization is managed is providing a central fine-grained authorization management system, which is configured to replace application-specific authorization management with a centralized authorization management. This centralized authorization management can provide consistent policy management across applications of an enterprise system, and can remove the task of policy management from developers of the applications. An example of a central fine-grained authorization management system is Oracle Entitlements Server. The central fine-grained authorization management system can then be integrated with one or more applications of an enterprise system. However, in order to integrate the central fine-grained authorization management system with existing applications, generally each application needs to be recoded to use an application programming interface ("API") of the central fine-grained authorization management system. If an enterprise system includes many existing applications, it may be expensive or impractical to recode all existing applications of the enterprise system to use the API of the central fine-grained authorization management system. Thus, it may not be reasonable, from a cost-perspective, for an enterprise system manager to integrate the central fine-grained authorization management system with existing applications, even to leverage the fine-grained authorization model. According to an embodiment, authorization decisions can be propagated to target applications independent of a runtime, so that the target applications do not need to be modified to be integrated with a central fine-grained authorization management system so that the target applications call the central fine-grained authorization management system at runtime, as will be discussed below in more detail.

Figure 1:
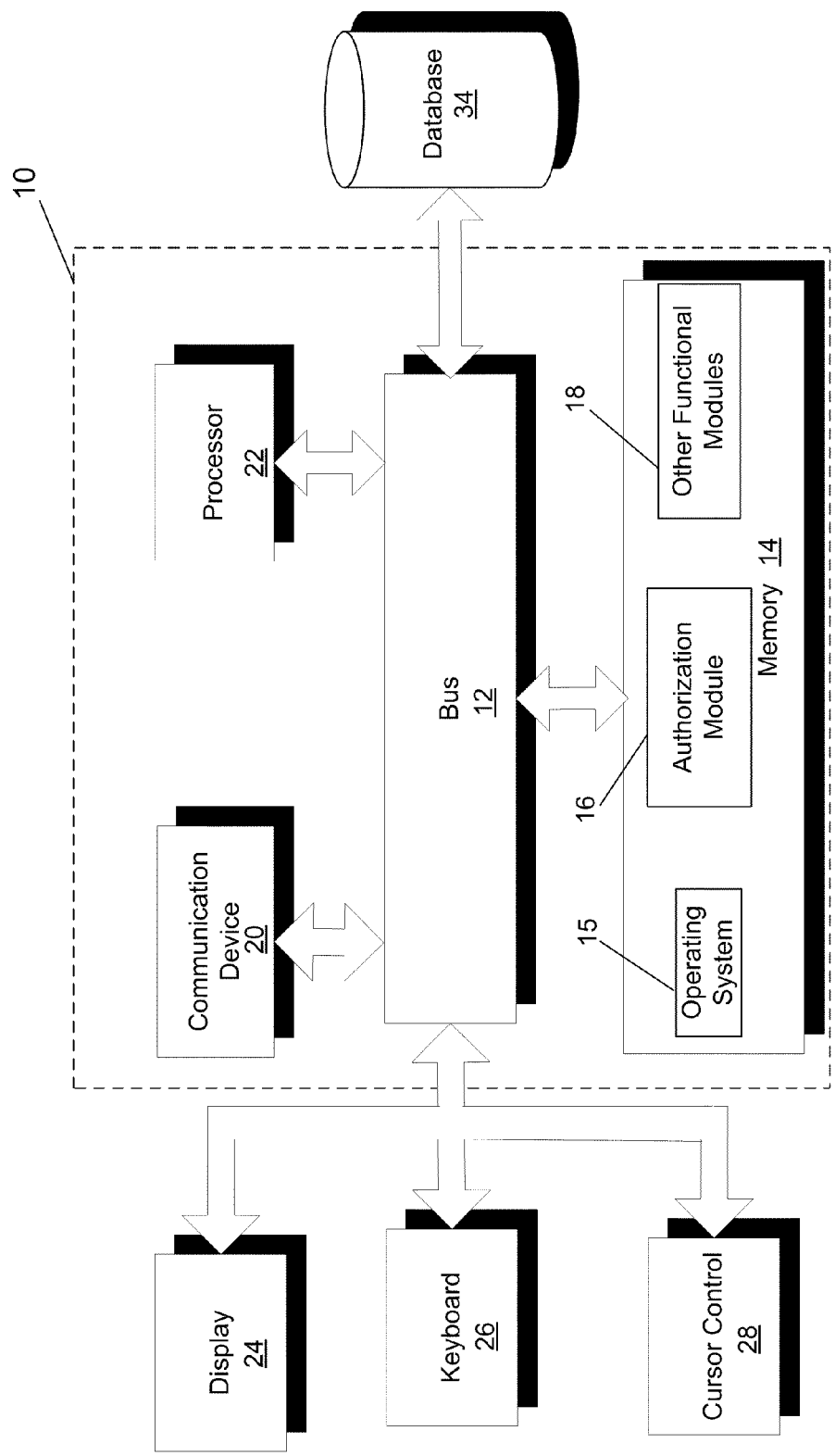
FIG. 1 illustrates a block diagram of a system that may implement an embodiment of the present invention.

FIG. 1 illustrates a block diagram of a system 10 that may implement one embodiment of the invention. System 10 includes a bus 12 or other communications mechanism for communicating information between components of system 10. System 10 also includes a processor 22, operatively coupled to bus 12, for processing information and executing instructions or operations. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer-readable medium. System 10 further includes a communication device 20, such as a network interface card or other communications interface, to provide access to a network. As a result, a user may interface with system 10 directly, or remotely through a network or any other method.

A computer-readable medium may be any available medium that can be accessed by processor 22. A computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 22 can also be operatively coupled via bus 12 to a display 24, such as a Liquid Crystal Display ("LCD"). Display 24 can display information to the user. A keyboard 26 and a cursor control device 28, such as a computer mouse, can also be operatively coupled to bus 12 to enable the user to interface with system 10.

According to one embodiment, memory 14 can store software modules that may provide functionality when executed by processor 22. The modules can include an operating system 15, an authorization module 16, as well as other functional modules 18. Operating system 15 can provide an operating system functionality for system 10. Authorization module 16 can provide functionality for defining access control rules and normalizing the results into decision tables, as will be described in more detail below. System 10 can also be part of a larger system. Thus, system 10 can include one or more additional functional modules 18 to include the additional functionality. For example, functional modules 18 may include modules that are part of the "Oracle Entitlements Server" product from Oracle Corporation. As another example, functional modules 18 may also include modules that part of the "Oracle Identity Manager" product from Oracle Corporation.

Processor 22 can also be operatively coupled via bus 12 to a database 34. Database 34 can store data in an integrated collection of logically-related records or files. Database 34 can be an operational database, an analytical database, a data warehouse, a distributed database, an end-user database, an external database, a navigational database, an in-memory database, a document-oriented database, a real-time database, a relational database, an object-oriented database, or any other database known in the art.

Figure 2:
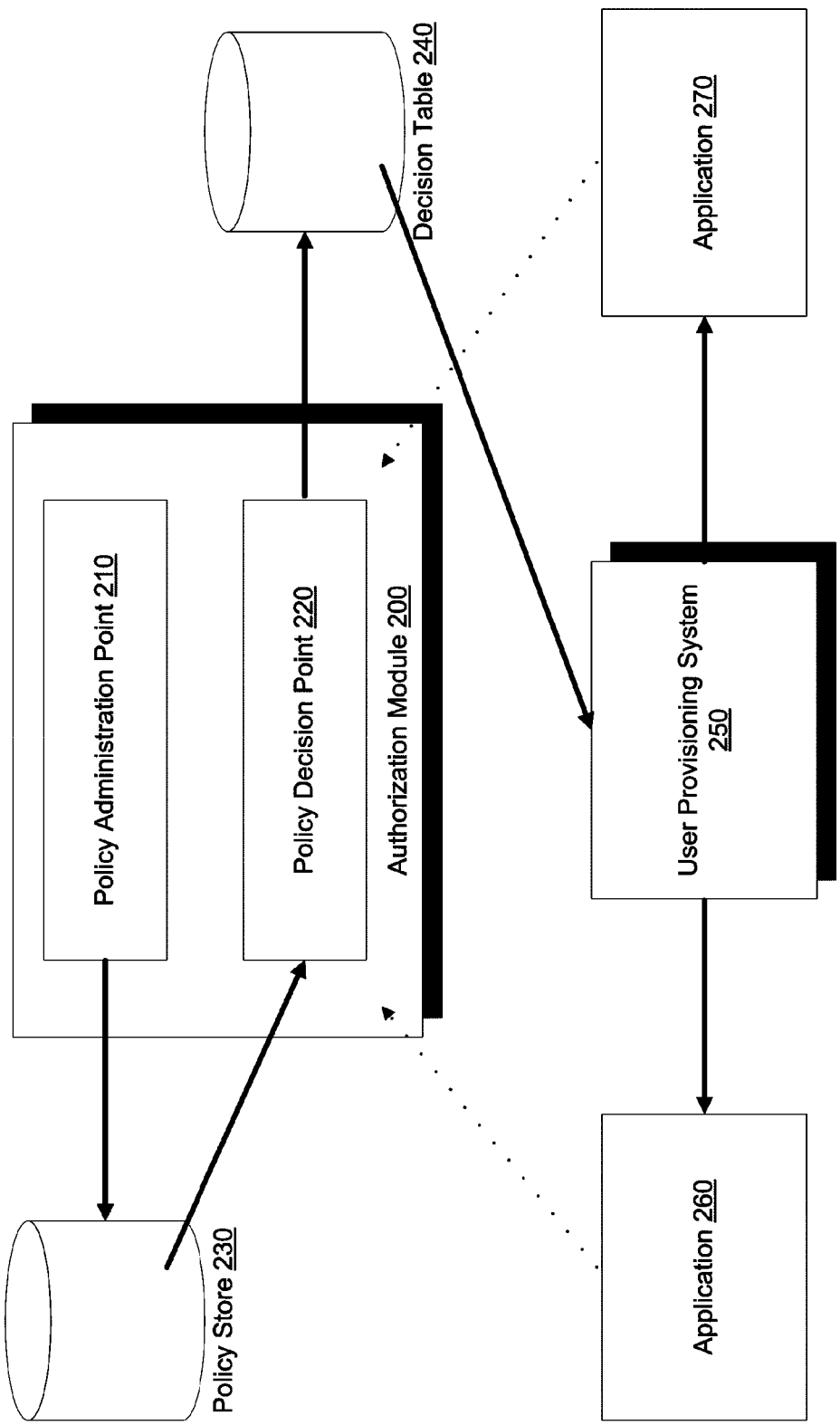
FIG. 2 illustrates a diagram of an enterprise system which includes an authorization module, a user provisioning system and target applications, according to an embodiment of the invention.

FIG. 2 illustrates a diagram of an enterprise system which includes an authorization module, a user provisioning system and target applications, according to an embodiment of the invention. An enterprise system is a computer system that is of an "enterprise class." This generally means that the computer system is configured to handle a large volume of data, provide a high quality of service, and support a large organization. As one of ordinary skill in the art would readily appreciate, the number of each component in the enterprise system is not limited to the number illustrated in FIG. 2, and the number of each component illustrated in FIG. 2 is merely an example to better illustrate an embodiment of the invention. Furthermore, one of ordinary skill in the art would readily appreciate that the enterprise system of FIG. 2 may be capable of having other components, and that other components not relevant to the illustrated embodiment of the invention are not illustrated in FIG. 2.

According to the embodiment, the enterprise system includes authorization module 200. In one embodiment, authorization module 200 of FIG. 2 corresponds to authorization module 16 of FIG. 1. Authorization module 200 is a software module, when run on a processor (not shown), that is configured to provide functionality for defining access control rules and normalizing the results into decision tables, as will be described in more detail below.

According to the embodiment, authorization module 200 is composed of at least two sub-modules, policy administration point 210 and policy decision point 220. Policy administration point 210 is configured to model an authorization policy (i.e., policy). An authorization policy is a rule, or set of rules, that governs access to a resource, or set of resources, of a target application. An authorization policy can be set up for a set of subjects (i.e., users, groups, or roles). A user is a user of the target application. A group is a collection of users where the users are grouped based on identity. For example, a group can be defined as including five users, e.g., User 1, User 2, User 3, User 4, and User 5. A role is also a collection of users, but rather than being grouped by identity, the collection is grouped by business function. For example, a role can be an administrative role, and can be assigned to one or more users who are assigned to an administrative business function. An example of an authorization policy is:

GRANT (GET //app/application/AccountReports/, //group/BankManagers)

This policy can be read as granting the "GET" action for the resource "AccountReports" to all users in the group of "BankManagers." An authorization policy can be modeled using an expressive policy language, such as eXtensible Access Control Markup Language ("XACML"). An example of an authorization policy is discussed in further detail in relation to FIG. 3.

Policy decision point 220 is configured to apply an authorization policy to an input and generate an authorization decision (i.e., "decision"). An authorization decision is a result of applying an authorization policy to an input and determining whether a subject can perform an action on a resource. An authorization decision can be represented as a "YES" or "NO," with a "YES" signifying that the subject can perform the action on the resource, and with a "NO" signifying that the subject cannot perform the action on the resource. An input can include a subject (i.e., user, group, or role) or a set of subjects, a resource or a set of resources, an action or set of actions, an environment, and context. Environment is defined as a set of characteristic attributes independent of a particular subject, resource, or action. Context is defined as a set of characteristic attributes of the subject, resource, or action. Environment and context can be used to more finely refine the applicable policy to generate the authorization decision.

In the illustrated embodiment, authorization module 200 includes sub-modules policy administration point 210 and policy decision point 220 in the illustrated embodiment. However, in an alternate embodiment, authorization module 200 performs the functionality of sub-module policy administration point 210 and sub-module policy decision point 220 itself. Furthermore, in the illustrated embodiment, authorization module 200 is located independent of user provisioning system 250, and applications 260 and 270. However, in alternative embodiments, authorization module 200 can be co-located with user provisioning system 250, application 260, or application 270. According to the embodiment, authorization module 200 can be configured to obtain an input from either application 260, application 270, or both applications, through one or more logical connections. However, in an alternative embodiment, authorization module 200 can be configured to obtain an input from a central user repository, such as a lightweight directory access protocol ("LDAP") (not shown), through one or more logical connections.

Policy store 230 is a persistent storage configured to store modeled authorization policies. Policy store 230 can be any type of persistent storage known in the art. For example, policy store 230 can be a database, a linked list, a lookup table, or a computer file. In an embodiment where policy store 230 is a database, policy store 230 can be an operational database, an analytical database, a data warehouse, a distributed database, an end-user database, an external database, a navigational database, an in-memory database, a document-oriented database, a real-time database, a relational database, an object-oriented database, or any other database known in the art.

Decision table 240 is a persistent storage configured to store generated authorization decisions. Decision table 240 can be any type of persistent storage known in the art. For example, decision table 240 can be a database, a linked list, a lookup table, or a computer file. In an embodiment where decision table 240 is a database, decision table 240 can be a an operational database, an analytical database, a data warehouse, a distributed database, an end-user database, an external database, a navigational database, an in-memory database, a document-oriented database, a real-time database, a relational database, an object-oriented database, or any other database known in the art. An example of a decision table is discussed in further detail in relation to FIG. 4.

User provisioning system 250 is a system (or application or service) configured to automatically manage user entitlements relative to related applications. An example of the management of user entitlements by a user provisioning system is the management of an employee that is hired by a company. Once the employee is hired, a user provisioning system can be configured to set up a user record in various related applications (such as an employee directory, an e-mail list, and a facility access list). When the employee's role at the company changes, such as a promotion or demotion, the user provisioning system can be configured to give the employee additional entitlements or remove entitlements from the employee. When the employee quits or is terminated, the user provisioning system can be configured to remove all entitlements from the employee, and optionally, remove all records of the employee from the system. As one of ordinary skill in the art would readily appreciate, this is merely an example of the management of user entitlements, and user provisioning system can manage any kind of user entitlements.

User provisioning system 250 can receive a set of provisioning requests from a client, and can execute one or more provisioning actions against target applications or resources. A provisioning request can be expressed using a provisioning language, such as Service Provisioning Markup Language ("SPML"). In executing a provisioning action against a target application, user provisioning system 250 can propagate an authorization decision from a persistent storage to a directory or some other external source where the authorization decision can be read by an application, such as applications 260 and 270.

Applications 260 and 270 are software applications that are part of the enterprise system. Applications 260 and 270 can be any software application known in the art that is configured to perform a singular task or multiple tasks. Applications 260 and 270 can each have a set of users, groups, roles, resources, and actions associated with the respective application. According to the embodiment, the authorization decisions for applications 260 and 270 can be determined by authorization module 200. The authorization decisions can be determined by authorization module 200 without applications 260 and 270 having to call an API of authorization module 200, as will be discussed in more detail.

Figure 3:
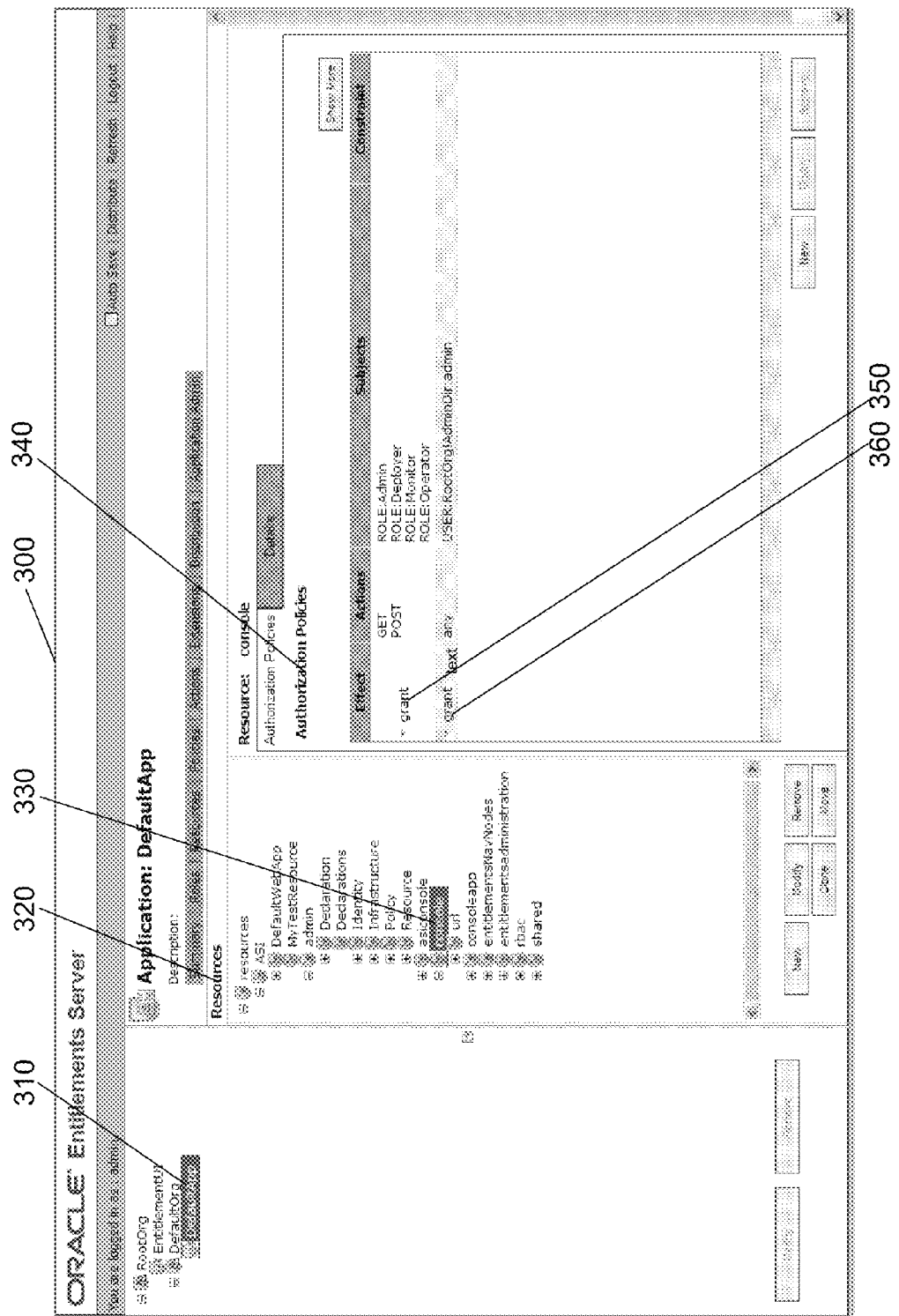
FIG. 3 illustrates an administrative user interface configured to display authorization policies according to an embodiment of the invention.

FIG. 3 illustrates an administrative user interface 300 configured to display authorization policies according to an embodiment of the invention. In the illustrated embodiment, user interface 300 is configured to display a navigational pane of different applications of an enterprise system. In the illustrated embodiment, application DefaultApp 310 is selected, which causes user interface 300 to display resource tree 320. Resource tree 320 includes a list of resources that belong to application DefaultApp 310. In the illustrated embodiment, resource console 330 is selected, which causes user interface 300 to display a list of authorization policies 340. These authorization policies protect access to resource console 330. Authorization policies 340 include authorization policy 350 which grants the actions GET and POST to roles Admin, Deployer, Monitor, and Operator. This means any user or group assigned one of the previously mentioned roles is allowed to perform the actions GET and POST on resource console 330. The authorization policies include authorization policy 360 which grants any action to user "RootOrg|AdminDir:admin." This means that the user admin is allowed to perform any action on resource console 330. Authorization policies 350 and 360 are examples of authorization policies modeled by authorization module 200 of FIG. 2, as will be discussed in more detail.

FIG. 4 illustrates a decision table 400 configured to hold authorization decisions according to an embodiment of the invention. As previously described, decision table 400 is a persistent storage configured to store generated authorization decisions. In the illustrated embodiment, each authorization decision is represented as a tuple, where the tuple includes a subject value, a resource value, an action value, a context value, and a decision value. However, one of ordinary skill in the art would readily appreciate that the tuple may include any number of values that represent an input of the applicable authorization policy, and any number of values that represent a decision of the applicable authorization policy.

The subject value, resource value, action value, and context value represent a subject, resource, action, and context, respectively, that serve as an input for an applicable authorization policy. The decision value represents the decision that results from the application of the applicable authorization policy to the input. While in the illustrated embodiment, each authorization decision is represented as a tuple, one of ordinary skill in the art would readily appreciate that this is merely an example representation of an access control list, which is a list of users and their respective entitlements determined by applying an applicable authorization policy. One of ordinary skill in the art would readily appreciate that an authorization decision can be represented in any form that indicates a decision that results from the applicable authorization policy and that can be understood by related applications in an enterprise system, and still be within the scope of the invention.

In the illustrated embodiment, decision table 400 includes authorization decisions 410, 420, 430, 440, and 450. Authorization decision 410 indicates that when the applicable authorization policy is applied to User 1 on Resource 1 for the Read action with the context "WEEKDAY=YES," the resulting decision is YES. In contrast, authorization decision indicates that when the applicable authorization policy is applied to User 2 on Resource 2 for the Read action with the context "WEEKDAY=NO," the resulting decision is NO. Thus, in combination, authorization decisions 410 and 420 indicate that from Monday through Friday, User 1 can perform the Read action on Resource 1, but on Saturday or Sunday, User 1 cannot perform the Read action on Resource 1. These authorization decisions can be generated independent of a runtime of the application, and thus, can be generated before User 1 attempt to access Resource 1, and thus, before an enterprise system can determine what day it is when the user attempts to access the resource.

According to the embodiment, authorization decision 430 indicates that when the applicable authorization policy is applied to User 2 on Resource 2 for the Write action with the context "ADMIN (USER 2)=YES," the resulting decision is YES. Likewise, authorization decision 440 indicates that when the applicable authorization policy is applied to User 2 on Resource 2 for the Execute action with the context "SUPERUSER (USER 2)=YES," the resulting decision is also YES. Thus, authorization decision 430 indicates that when User 2 is assigned the role of ADMIN, User 2 can perform the write action on Resource 2. Likewise, authorization decision 440 indicates that when User 2 is assigned the role of SUPERUSER, User 2 can perform the execute action on Resource 2. Finally, authorization decision 450 indicates that when the applicable authorization policy is applied to User 3 on Resource 3 for the Delete action with any context, the resulting decision is NO. Thus, User 3 cannot perform the Delete action on Resource 3 under any circumstances.

Figure 5:
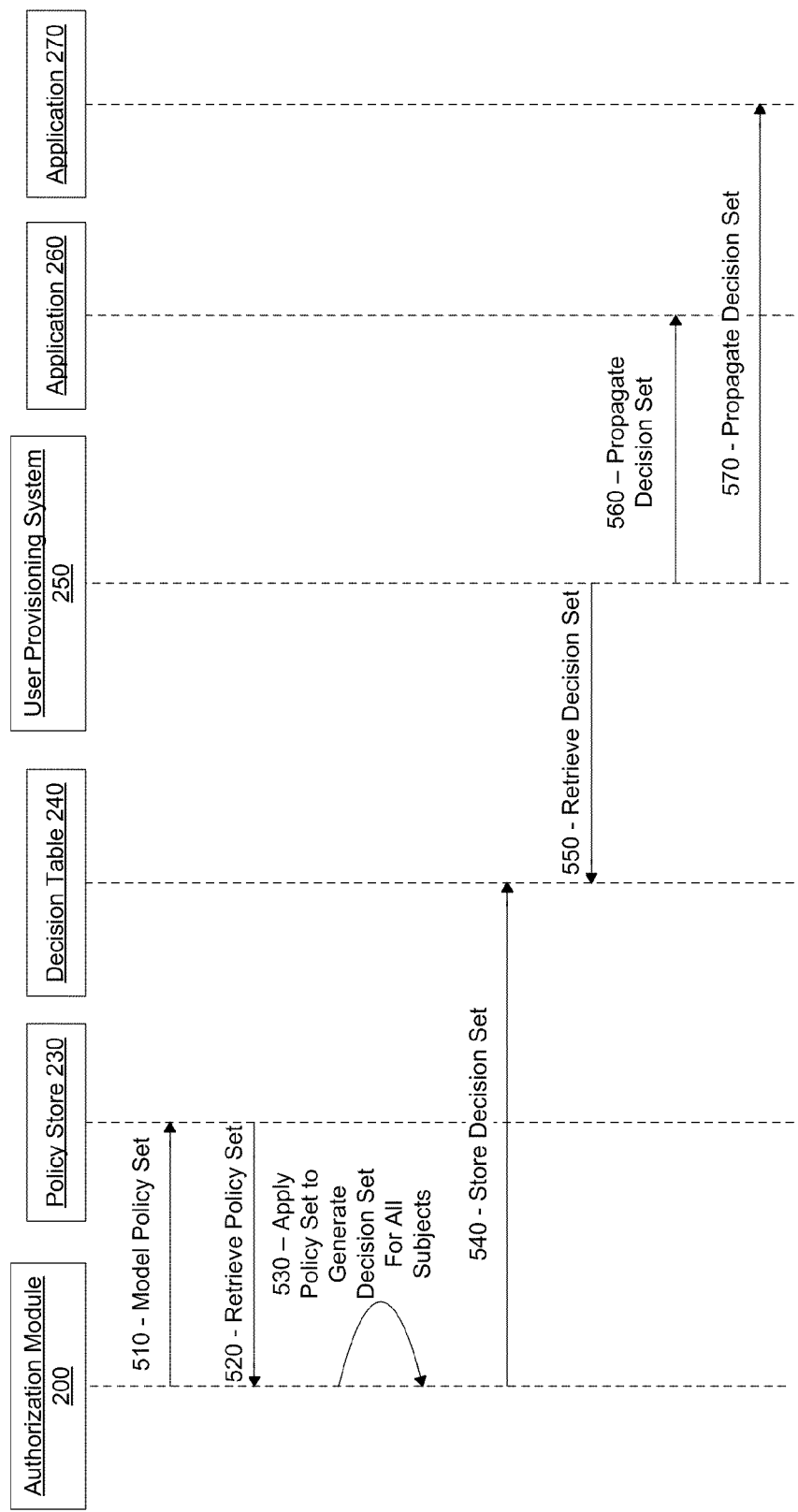
FIG. 5 illustrates a sequence diagram of an initial propagation of authorization decisions according to an embodiment of the invention.
Figure 6:
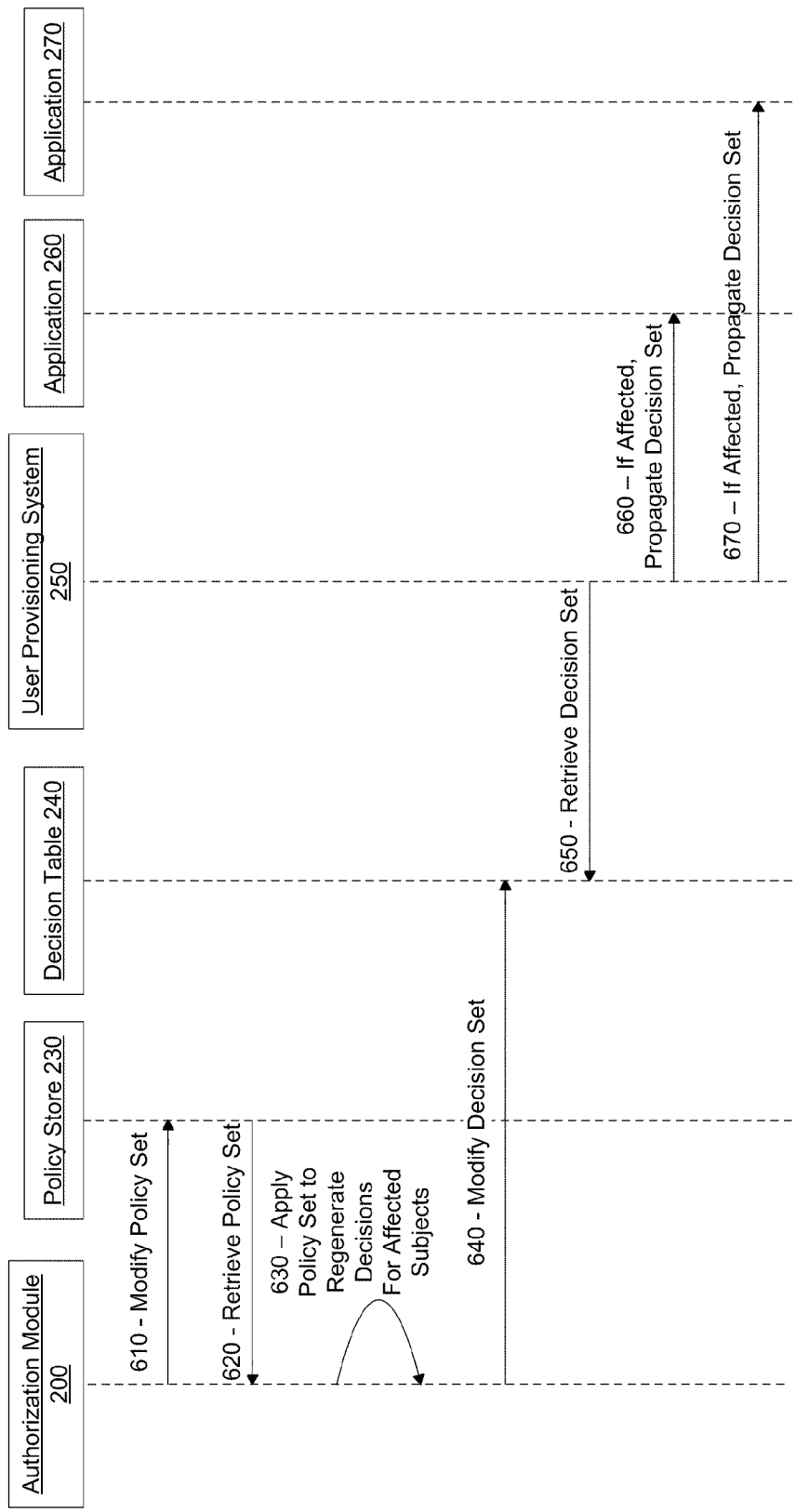
FIG. 6 illustrates a sequence diagram of an incremental propagation of authorization decisions according to an embodiment of the invention.

FIGS. 5 and 6 each illustrate a sequence diagram of a propagation of authorization decisions to related applications in an enterprise system independent of a runtime of the related applications, according to respective embodiments of the invention. According to the respective embodiments, the authorization decisions of an authorization module can be propagated to target applications without requiring each target application to call an API of the authorization module. FIG. 5 illustrates an initial propagation where, according to the embodiment of the invention, an authorization module generates authorization decisions for all subjects of each target application. In contrast, FIG. 6 illustrates an incremental propagation where, according to the embodiment of the invention, an authorization module modifies authorization decisions for subjects that are affected by a change in one or more authorization policies.

FIG. 5 illustrates a sequence diagram of an initial propagation of authorization decisions according to an embodiment of the invention. The sequence diagram involves authorization module 200, policy store 230, decision table 240, user provisioning system 250, and applications 260 and 270 of FIG. 2. According to the embodiment, this sequence is performed upon the first instance of propagating authorization decisions to target applications of an enterprise system. Thus, the initial sequence occurs in a context where no authorization decisions have been previously propagated by authorization module 200 to applications 260 and 270.

At 510, authorization module 200 models a policy set. A policy set can include one or more authorization policies. As previously described, an authorization policy is a rule, or set of rules, that governs access to a resource, or set of resources, of a target application, and an authorization policy can be modeled using an expressive policy language, such as XACML. According to the embodiment, the authorization policy can be modeled as if the authorization policy will be enforced at runtime, even though, as previously described, an authorization decision is generated independent of a runtime of the target application. In an embodiment of the invention, the modeling of the policy set is performed by sub-module policy administration point 210 of authorization module 200. According to the embodiment of the invention, the modeling of the policy set includes storing the policy set in policy store 230.

At 520, authorization module 200 retrieves the policy set stored at policy store 230. In an embodiment of the invention, the retrieval of the stored policy set is performed by sub-module policy decision point 220 of authorization module 200.

At 530, authorization module 200 applies the policy set to generate a decision set for all subjects of each target application of an enterprise system. A decision set can include one or more authorization decisions. As previously described, an authorization decision is a result of applying an applicable authorization policy to an input and determining whether a subject can perform an action on a resource. As also previously described, an input can include a subject (i.e., user, group, or role) or a set of subjects, a resource or a set of resources, an action or set of actions, an environment, and context. According to the embodiment, authorization module 200 can establish a logical connection to decision table 240 as well as applications 260 and 270. A logical connection represents a connection where data can be transferred from a first enterprise system entity to a second system entity. In the embodiment, authorization module 200 can utilize a logical connection to applications 260 and 270 in order to retrieve one or more inputs that is applicable to each application. As described above an input is used by authorization module 200 to generate an authorization decision based on an applicable authorization policy. However, according to alternate embodiments, authorization module 200 can retrieve the one or more inputs from locations other than applications 260 and 270. For example, in an alternate embodiment, authorization module 200 can utilize a logical connection to a central user repository (not shown) in order to retrieve the one or more inputs applicable to each application.

According to the embodiment of the invention, because the sequence illustrated in FIG. 5 is an initial sequence, and because in the embodiment authorization module 200 has not previously generated any authorization decisions, each authorization policy of the policy set is applied to each and every subject of each target application. This is identified as "bootstrapping" each target application, so that at least one authorization decision is generated for each subject of each application. In an embodiment of the invention, the generating of the decision set is performed by sub-module policy decision point 220 of authorization module 200.

At 540, authorization module 200 stores the decision set in decision table 240. In an embodiment of the invention, the storage of the decision set is performed by sub-module policy decision point 220 of authorization module 200.

At 550, user provisioning system 250 retrieves the stored decision set from decision table 240. According to the embodiment, user provisioning system 250 can establish a logical connection to decision table 240 as well as applications 260 and 270. As previously described, a logical connection represents a connection where data can be transferred from a first enterprise system entity to a second system entity.

At 560, user provisioning system 250 propagates the decision set retrieved from decision table 240 to application 260. According to the embodiment of the invention, the decision set is propagated over a logical connection that is configured to transfer data between user provisioning system 250 and application 260. Thus, the decision set is propagated to application 260 without the requirement of recoding application 260 to call the API of authorization module 200. In an embodiment, the propagation of the decision set to application 260 can include propagating the actual authorization decisions to application 260. In another embodiment, if application 260 is only capable of externalizing roles and privileges for each subject, but is not capable of externalizing the reasoning for the assignment of roles and privileges to each subject, the propagation of the decision set to application 260 can include propagating the roles and privileges for each subject. Furthermore, in another embodiment, if application 260 is only capable of externalizing roles for each subject, but is not capable of externalizing the privileges assigned to the roles, the propagation of the decision set to application 260 can include propagating the roles for each subject. Once the decision set is propagated to application 260, application 260 can integrate the decision set with its existing authorization information. Such integration is described in more detail in relation to FIGS. 7-9.

At 570, user provisioning system 250 propagates the decision set retrieved from decision table 240 to application 270. This is identical to 560, but instead of the target application being application 260, the target application is application 270. In alternative embodiments, user provisioning system 250 can propagate the decision set to any number of related applications that are a part of the enterprise system.

FIG. 6 illustrates a sequence diagram of an incremental propagation of authorization decisions according to an embodiment of the invention. Similar to FIG. 5, the sequence diagram involves authorization module 200, policy store 230, decision table 240, user provisioning system 250, and applications 260 and 270 of FIG. 2. According to the embodiment, this sequence is performed after an initial sequence of authorization decision propagation has already occurred. Thus, the incremental sequence occurs in the a context where authorization decisions have been previously propagated to applications 260 and 270.

At 610, authorization module 200 modifies a policy set stored at policy store 230. According to the embodiment, the modifying a policy set includes modifying one or more authorization policies. For example, an existing authorization policy that grants all users a certain set of privileges as long as their age is greater than or equal to 18 years can be modified to only grant users the set of privileges if their age is greater than or equal to 21 years. Any user whose age is 18 years, 19 years, or 20 years will be affected by this modification in authorization policy, as the set of privileges they previously enjoyed will be revoked. Also according to the embodiment, the modifying the policy set includes storing the modified policy set at policy store 230. In an embodiment of the invention, the modifying of the policy set is performed by sub-module policy administration point 210 of authorization module 200.

At 620, authorization module 200 retrieves the modified policy set stored at policy store 230. In an embodiment of the invention, the retrieval of the modified policy set is performed by sub-module policy decision point 220 of authorization module 200.

At 630, authorization module 200 determines a set of subjects that are affected by the modifications to the policy set and applies the modified policy set to regenerate authorization decisions for the affected subjects. Authorization module 200 can determine a set of affected subjects using one of a number of techniques. According to one embodiment of the invention, authorization module 200 simply regenerates the authorization decisions for each and every user of the related application, similar to the illustrated embodiment in FIG. 5. If the generated authorization decision is the same as the previous authorization decision, then the previous authorization decision is not modified, and the regenerated authorization decision is discarded. If the generated authorization decision is not the same as the previous authorization decision, then the previous authorization decision is modified. This technique is identified as the "brute force" technique.

However, in an alternative embodiment of the invention, authorization module 200 examines the context of the modifications to the authorization policies in order to determine which subjects are affected by the modifications. For example, referring to the previous example where the authorization policy grants all users a certain set of privileges as long as their age is greater than or equal to 18 years is changed to only grant users the set of privileges if their age is greater than or equal to 21 years, authorization module 200 can determine that only subjects whose age is between 18 years and 20 years will be affected by the modification to the authorization policy. Thus, according to the embodiment, authorization module 200 only regenerates the authorization decisions for subjects who age is between 18 years and 20 years. This technique is identified as the "targeted" technique. According to an embodiment of the invention, whether the brute force technique is used, or the targeted technique is used, the regeneration of authorization decisions is performed by sub-module policy decision point 220 of authorization module 200.

At 640, authorization module 200 uses the regenerated authorization decisions of 230 to modify the decision set stored in decision table 240. According to the embodiment, this can include comparing the regenerated decisions to the decision set stored in decision table 240 and adding new authorization decisions that are found in the regenerated authorization decisions but not found in the decision set stored in decision table 240. This can also include comparing the regenerated decisions to the decision set stored in decision table 240 and modifying existing authorization decisions that are found in the decision set stored in decision table 240, but have been modified in the regenerated authorization decisions. This can also include comparing the regenerated decisions to the decision set stored in decision table 240 and deleting existing authorization decisions that are found in the decision set stored in decision table 240, but not found in the regenerated authorization decisions. According to an embodiment of the invention, the modification of the decision set stored in decision table 240 is performed by sub-module policy decision point 220 of authorization module 200.

At 650, user provisioning system 250 retrieves the modified decision set from decision table 240. According to the embodiment, user provisioning system 250 can establish a logical connection to decision table 240 as well as applications 260 and 270. As previously described, a logical connection represents a connection where data can be transferred from a first enterprise system entity to a second system entity.

At 660, user provisioning system 250 determines if the modified decision set affects application 260, and if the modified decision set does affect application 260, then user provisioning system propagates the modified decision set retrieved from decision table 240 to application 260. According to the embodiment, if at least one modified authorization decision of the modified decision set involves a subject of application 260, then the modified decision set affects application 260.

At 670, user provisioning system 250 determines if the modified decision set affects application 270, and if the modified decision set does affect application 270, then user provisioning system propagates the modified decision set retrieved from decision table 240 to application 270. This is identical to 660, but instead of the target application being application 260, the target application is application 270. In alternative embodiments, user provisioning system 250 can propagate the modified decision set to any number of related applications that are a part of the enterprise system and are affected by the modified decision set.

Figure 7:
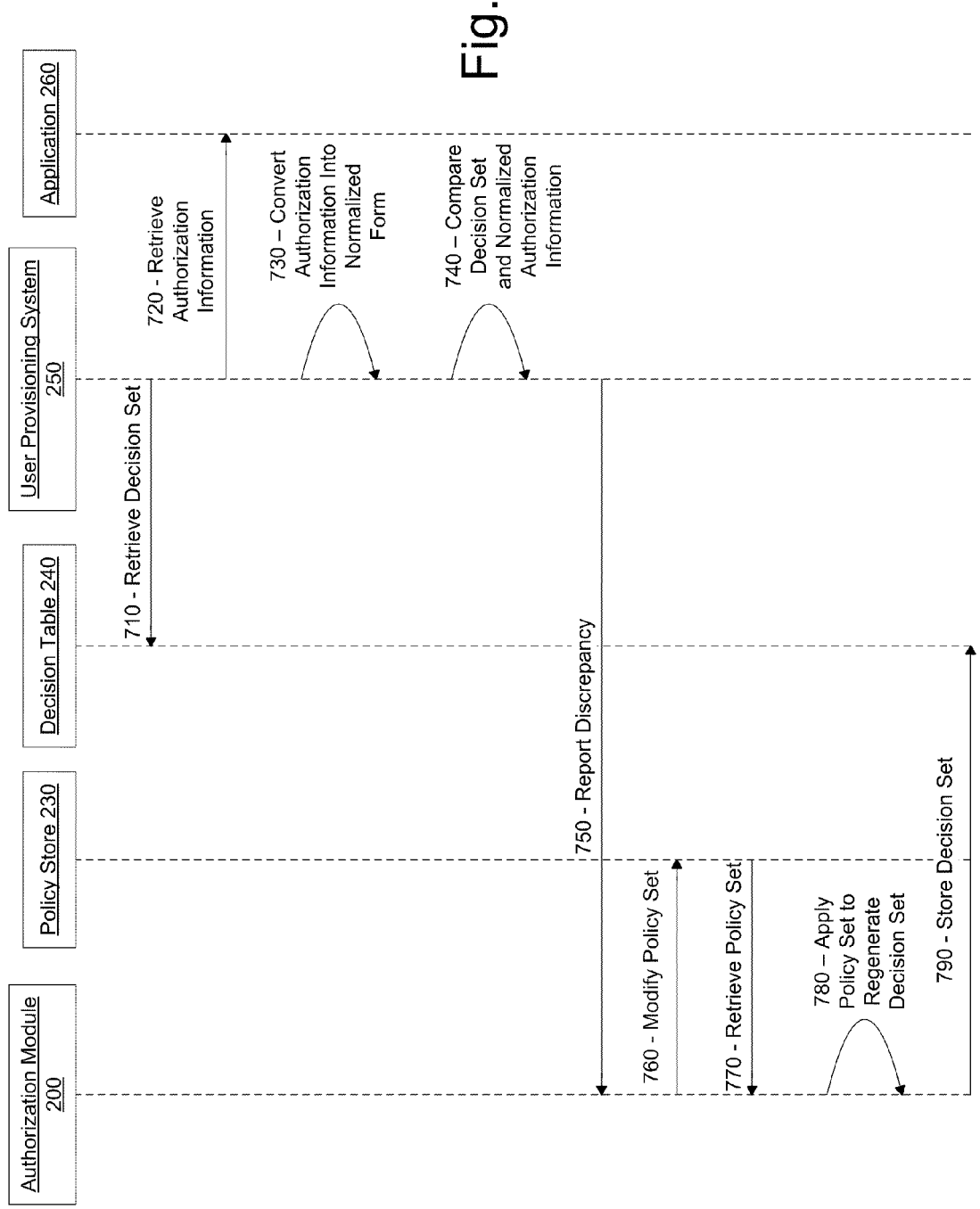
FIG. 7 illustrates a sequence diagram for modifying authorization decisions based on a reported discrepancy of a target application according to an embodiment of the invention.
Figure 8:
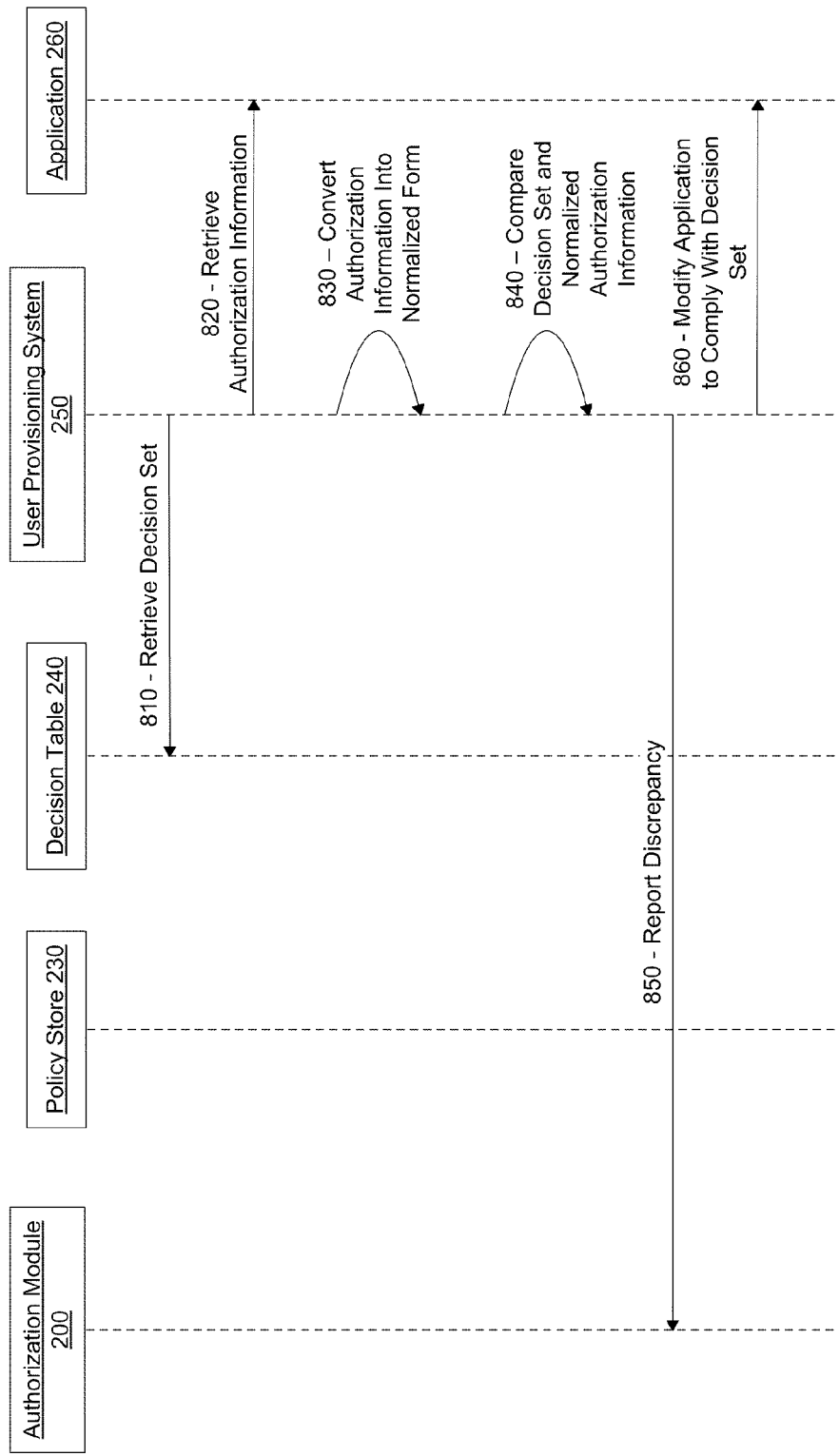
FIG. 8 illustrates a sequence diagram for modifying a target application based on a reported discrepancy of the target application according to an embodiment of the invention.
Figure 9:
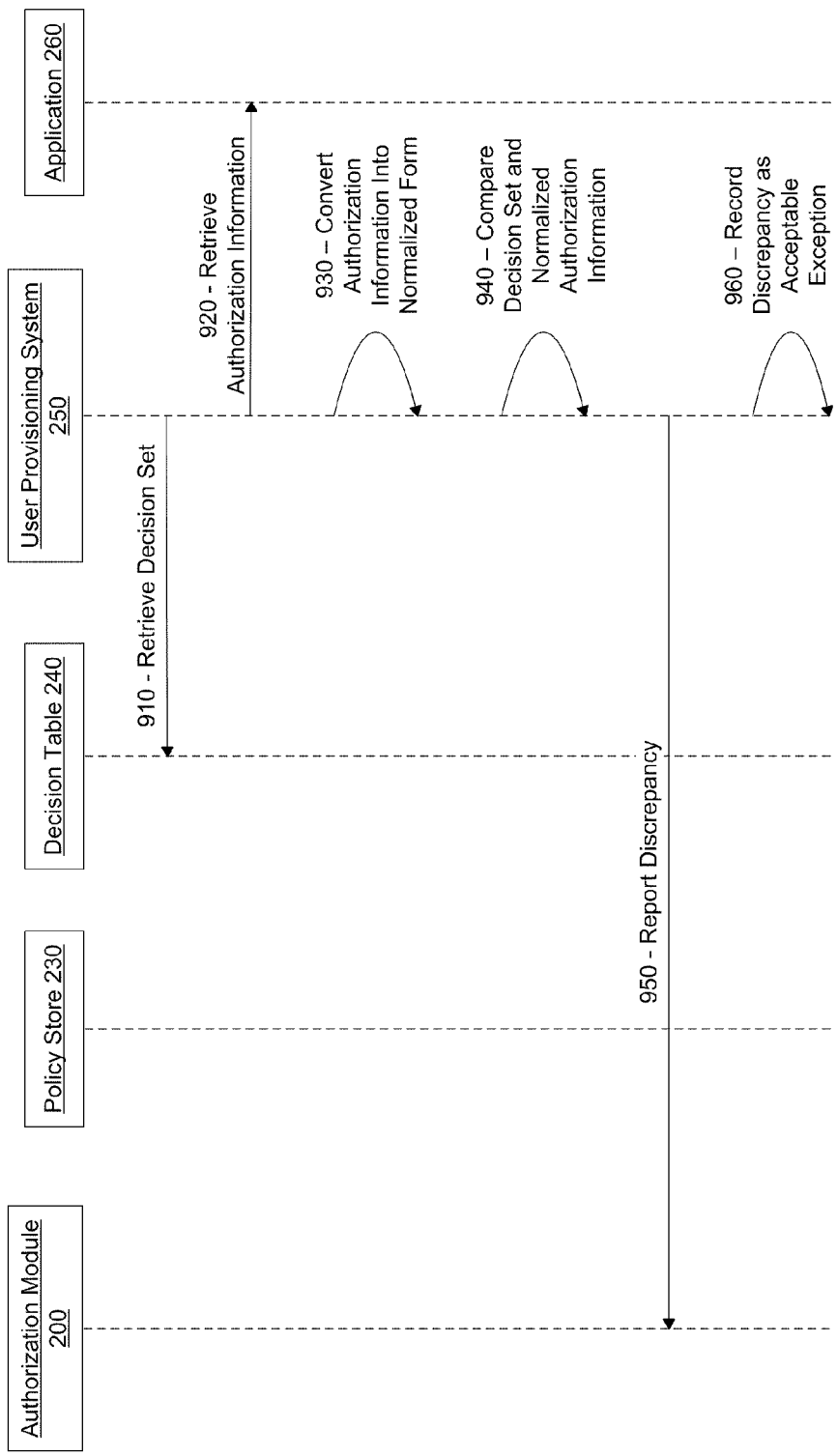
FIG. 9 illustrates a sequence diagram for recording a discrepancy of a target application as an acceptable exception according to an embodiment of the invention.

FIGS. 7, 8, and 9 each illustrate a sequence diagram of an integration of a decision set generated by authorization module 200 and authorization information of application 260. As previously described, a decision set can include one or more authorization decisions, and a decision set can be an initial decision set or a modified decision set. Authorization information can include a set of authorization rules inherent to application 260. For example, authorization information can include authorization rules based on the source code of application 260, based on a set of loosely connected lookup tables, or based on a set of authorization policies and decisions similar to the authorization policies and decisions generated by authorization module 200. In an embodiment of the invention, authorization information can include a set of authorization decisions previously propagated by user provisioning system 250.

According to the embodiment, integration of a decision set generated by authorization module 200 and authorization information of application 260 can occur during an initial propagation of authorization decisions. More specifically, during an initial propagation, a decision set is generated by authorization module 200. Ideally, the decision set matches the authorization information of application, and the authorization information can be replaced by the decision set. However, discrepancies between the decision set generated by authorization module 200 and authorization information of application 260 may exist. The cause of a discrepancy can be one of the following reasons. An authorization decision of the decision set generated by authorization module 200 may be incorrect. The authorization information of application 260 may contain a flaw, and application 260 may need to be modified to comply with the applicable authorization policy of the decision set. Finally, the authorization information of application 260 may be incorrect, but the discrepancy can be ignored. According to the embodiment, the decision set generated by authorization module 200 and authorization information of application 260 can be integrated in an iterative fashion, until all discrepancies have either been eliminated or marked as an acceptable exception.

Integration of a decision set generated by authorization module 200 and authorization information of application 260 includes comparing the two and identifying any discrepancy between the two that resides in application 260. Any identified discrepancy can be addressed in a number of ways. For example, the applicable authorization policy of authorization module 200 can be changed, the authorization decisions can be regenerated, and the decision set can be modified. This process can be repeated until the discrepancy is eliminated. As another example, application 260 can be modified to comply with the applicable authorization decision of the decision set. As yet another example, the discrepancy can be recorded as an acceptable exception so that the exception is ignored in subsequent iterations of discrepancy detection. Each technique used to integrate a decision set generated by authorization module 200 and authorization information of application 260 is discussed below in greater detail. Furthermore, as one of ordinary skill in the art would readily appreciate, while only a single application (i.e., application 260) is shown for purposes of clarity, each sequence illustrated in FIGS. 7, 8, and 9, respectively can be performed for any number of target applications.

FIG. 7 illustrates a sequence diagram for modifying authorization decisions based on a reported discrepancy of a target application according to an embodiment of the invention. The sequence diagram involves authorization module 200, policy store 230, decision table 240, user provisioning system 250, and application 260 of FIG. 2. At 710, user provisioning system 250 retrieves a stored decision set from decision table 240. At 720, user provisioning system 250 retrieves authorization information from application 260. According to the embodiment, user provisioning system 250 can establish a logical connection to decision table 240 as well as applications 260 and 270. As previously described, a logical connection represents a connection where data can be transferred from a first enterprise system entity to a second system entity.

At 730, user provisioning system 250 converts the authorization information from application 260 into a normalized form such that it can be compared with the authorization decisions of the decision set of authorization module 200. As previously described, authorization information of application 260 can take any form, such as authorization rules defined by source code of application 260, or authorization rules defined by a set of lookup tables. Thus, in order to perform any meaningful comparison, user provisioning system 250 first converts the authorization information into a normalized form.

At 740, user provisioning system 250 compares the decision set of authorization module 200 with the normalized application information of application 260. By comparing the decision set with the normalized application information, user provisioning system 250 determines whether the existing authorization rules of application 260 comply with the authorization decisions of the decision set of authorization module 200. If no discrepancy is found between the decision set and the normalized application information, the sequence ends at 740. Otherwise, the sequence continues on to 750.

At 750, if a discrepancy is found, user provisioning system 250 reports the discrepancy to authorization module 200. After the discrepancy is reported to authorization module 200, it is determined that one or more authorization policies need to be modified in light of the discrepancy.

At 760, authorization module 200 modifies the policy set stored in policy store 230. According to the embodiment, the modification of the policy set includes modifying one or more authorization policies to be consistent with the authorization information of application 270. For example, if the policy set includes an authorization policy granting the "GET" action for the resource "AccountReports" to all users in the group of "BankManagers," as discussed in a previous example, but the authorization information of application 260 indicates that all users in the group of "BankTellers" also have access to the "GET" action for the resource "AccountReports," then the authorization policy can be modified to grant the "GET" action to all users in the group of "BankTellers" as well as "BankMangers" for the resource "AccountReports." In an embodiment of the invention, the modifying of the policy set is performed by sub-module policy administration point 210 of authorization module 200.

At 770, authorization module 200 retrieves the policy set stored at policy store 230. In an embodiment of the invention, the retrieval of the stored policy set is performed by sub-module policy decision point 220 of authorization module 200.

At 780, authorization module 200 applies the modified policy set to regenerate the decision set. As previously described, an authorization decision is a result of applying an applicable authorization policy to an input and determining whether a subject can perform an action on a resource. Because the one or more applicable authorization policies are modified at 760, authorization module regenerates the corresponding authorization decisions in order to update the decision set. In an embodiment of the invention, the generating of the decision set is performed by sub-module policy decision point 220 of authorization module 200.

At 790, authorization module 200 stores the modified decision set in decision table 240. In an embodiment of the invention, the storage of the decision set is performed by sub-module policy decision point 220 of authorization module 200. Thus, according to the embodiment, the decision set is modified to be more consistent with the authorization information of application 260.

Subsequently, the comparison of 740 is repeated. If the modification to the decision set does not remove the discrepancy, then 750, 760, 770, 780, and 790 are repeated until the discrepancy is removed. The sequence illustrated in FIG. 7 is repeated for each discrepancy found by user provisioning system 250. Once the discrepancy is removed, the externalized authorization policies represent the authorization policies inside of application 260. According to an embodiment of the invention, with the models synchronized, management of subjects and their entitlements can now be done from outside of application 260, with confidence that the resulting authorization decisions will be the same as if managed from inside the application. This can allow for the decommissioning of application-specific management tools (such as management screens), and can allow for centralized enforcement of the authorization policy, which can result in better operational efficiency and cost savings.

FIG. 8 illustrates a sequence diagram for modifying a target application based on a reported discrepancy of the target application according to an embodiment of the invention. Similar to FIG. 7, the sequence diagram involves authorization module 200, policy store 230, decision table 240, user provisioning system 250, and application 260 of FIG. 2. According to the embodiment, the sequence components of 810, 820, 830, 840, and 850 are identical to the sequence components of 710, 720, 730, 740, and 750 of FIG. 7, respectively. After the discrepancy is reported to authorization module 200, it is determined that application 260 needs to be modified to comply with the applicable authorization policy.

At 860, user provisioning system 250 modifies application 260 such that the authorization information of application 260 complies with the decision set of authorization module 200, thus eliminating the discrepancy. For example, user provisioning system 250 recodes application 260 to comply with the decision set of authorization module 200. In another example, user provisioning system 250 modifies a set of lookup tables which contain authorization information of application 260 to comply with the decision set of authorization module 200. The sequence illustrated in FIG. 8 is repeated for each discrepancy found by user provisioning system 250.

FIG. 9 illustrates a sequence diagram for recording a discrepancy of a target application as an acceptable exception according to an embodiment of the invention. Similar to FIGS. 7 and 8, the sequence diagram involves authorization module 200, policy store 230, decision table 240, user provisioning system 250, and application 260 of FIG. 2. According to the embodiment, the sequence components of 910, 920, 930, 940, and 950 are identical to the sequence components of 710, 720, 730, 740, and 750 of FIG. 7, respectively, and are identical to the sequence components of 810, 820, 830, 840, and 850 of FIG. 8, respectively. After the discrepancy is reported to authorization module 200, it is determined that the discrepancy is an acceptable exception to the decision set of authorization module 200.

At 960, user provisioning system 250 records the discrepancy as an acceptable exception. Thus, while neither modifying the decision set of authorization module 200, nor changing application 260, user provisioning system will make a record so that, when the decision set and authorization information are compared again during integration, the discrepancy will not be identified and reported to authorization module 200. The sequence illustrated in FIG. 9 is repeated for each discrepancy found by user provisioning system 250.

Figure 10:
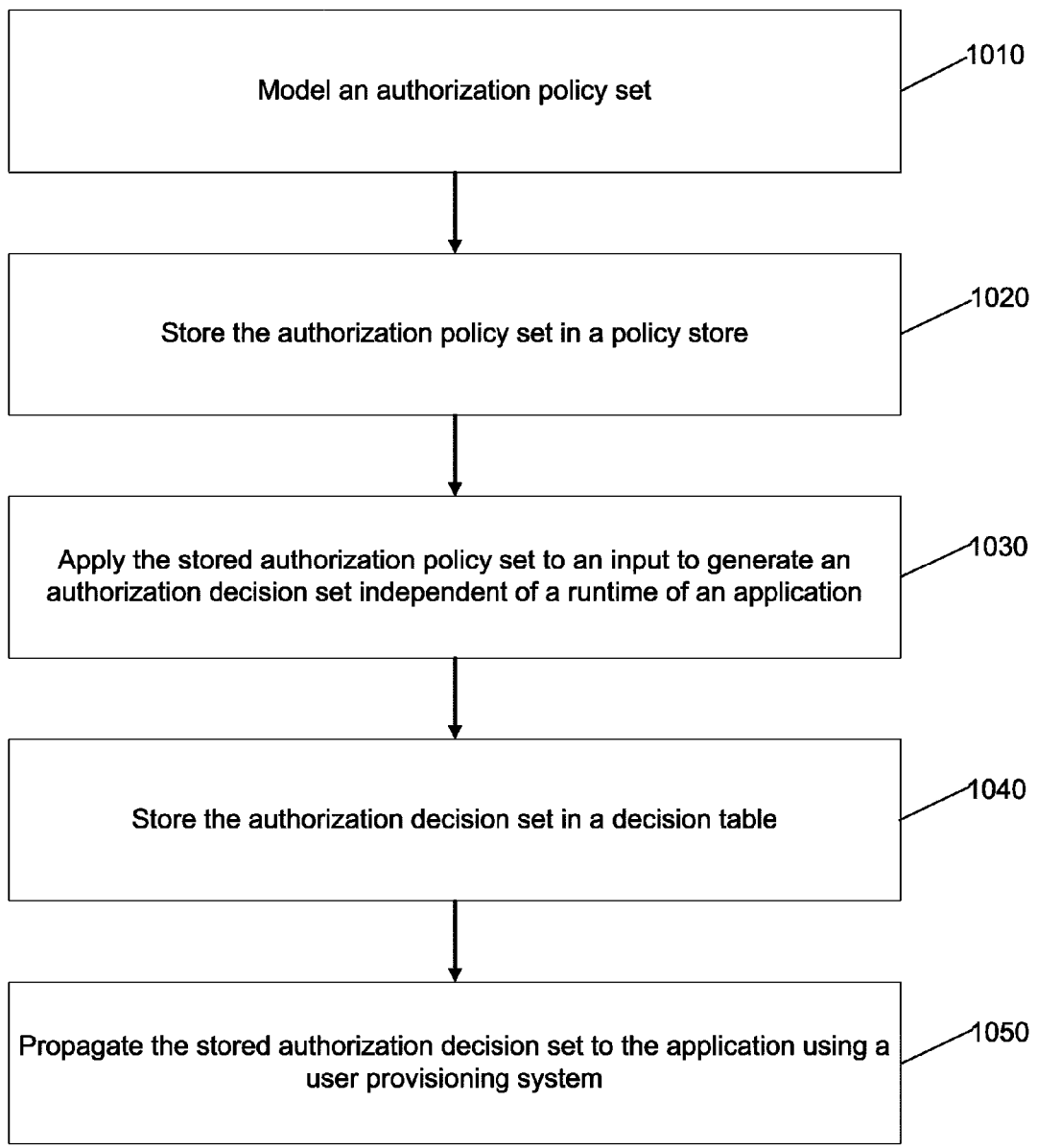
FIG. 10 illustrates a flow diagram of the functionality of an authorization module, according to an embodiment of the invention.

FIG. 10 illustrates a flow diagram of the functionality of an authorization module according to an embodiment of the invention. In one embodiment, the functionality of the flow diagram of FIG. 10 is implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

At 1010, an authorization policy set is modeled. At 1020, the authorization policy set is stored in a policy store. At 1030, the stored authorization policy set is applied to an input to generate an authorization decision set independent of a runtime of an application. At 1040, the authorization decision set is stored in a decision table. At 1050, the stored authorization decision set is propagated to the application using a user provisioning system.

Thus, according to an embodiment of the invention, authorization decisions can be automatically calculated using an authorization module, and stored in a decision table, where the authorization decisions can be propagated to related applications. Rather than recoding the related application to call an API of the authorization module, the authorization module can generate an authorization decision set asynchronously, and propagate the authorization decision set to the related application, even if the related application is offline. According to the embodiment, the modeling of authorization policies, and the generation of authorization decisions, using the authorization module, can result in a central administration of authorization policies and decisions, where the policies and decisions for all related applications are generated in a single place. Thus, the consistency of the authorization policies and decisions can be increased.

Furthermore, an embodiment of the invention can enable the application of a richer authorization model to a related application that cannot externalize authorization at runtime. In other words, according to the embodiment, an authorization policy can be generated based on a body of reasoning as to why a user has certain roles and privileges, even if the related application is only capable of externalize that the user has the roles and privileges. Thus, it is easier to audit why a user has certain roles and privileges.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause the processor to implement an authorization policy, the implementing comprising:
    modeling an authorization policy set comprising one or more authorization policies;
    storing the authorization policy set in a policy store;
    retrieving from an application an input of the application, wherein the input of the application comprises at least one of a subject, a resource, or an action;
    applying the stored authorization policy set to the input of an application to generate an authorization decision set independent of the application using an application programming interface of the policy store, wherein the authorization decision set comprises one or more authorization decisions;
    storing the authorization decision set in a decision table;
    propagating the stored authorization decision set to the application using a user provisioning system;
    modifying the authorization policy set; and
    applying the modified authorization policy set to the input to regenerate the authorization decision set.

2. The non-transitory computer-readable medium of claim 1, the implementing further comprising:
    converting authorization information of the application into a normalized form;
    comparing the authorization decision set with the normalized authorization information of the application;
    reporting a discrepancy between authorization information of the application and the authorization decision set;
    modifying the authorization policy set based on the discrepancy; and
    applying the modified authorization policy set to the input to regenerate the authorization decision set.

3. The non-transitory computer-readable medium of claim 1, wherein the input comprises a set of subjects, a set of resources, a set of actions, an environment, and a context.

4. The non-transitory computer-readable medium of claim 1, wherein the applying the stored authorization policy set to the input further comprises applying the stored authorization policy set to each subject of the input.

5. The non-transitory computer-readable medium of claim 1, the implementing further comprising:
    determining a set of subjects of the input that are affected by the modifications to the authorization policy set; and
    applying the modified authorization policy set to only the set of subjects to regenerate the authorization decision set.

6. The non-transitory computer-readable medium of claim 1, wherein the authorization policy set is modeled using an eXtensible Access Control Markup Language.

7. The non-transitory computer-readable medium of claim 1, wherein the stored authorization decision set is propagated using a provisioning request.

8. The non-transitory computer-readable medium of claim 7, wherein the provisioning request is expressed using a Service Provisioning Markup Language.

9. The non-transitory computer-readable medium of claim 1, wherein propagating the stored authorization decision set further comprises propagating roles for each subject of the input.

10. The non-transitory computer-readable medium of claim 9, wherein propagating the stored authorization decision set further comprises propagating privileges for each subject of the input.

11. A computer-implemented method for implementing an authorization policy, comprising:
    modeling an authorization policy set comprising one or more authorization policies;
    storing the authorization policy set in a policy store;
    retrieving from an application an input of the application, wherein the input of the application comprises at least one of a subject, a resource, or an action;
    applying the stored authorization policy set to the input to generate an authorization decision set for an application independent of the application using an application programming interface of the policy store, wherein the authorization decision set comprises one or more authorization decisions;

storing the authorization decision set in a decision table;

propagating the stored authorization decision set to the application using a user provisioning system;

modifying the authorization policy set; and applying the modified authorization policy set to the input to regenerate the authorization decision set.

12. The computer-implemented method of claim 11, further comprising:

converting authorization information of the application into a normalized form;

comparing the authorization decision set with the normalized authorization information of the application;

reporting a discrepancy between authorization information of the application and the authorization decision set;

modifying the authorization policy set based on the discrepancy; and applying the modified authorization policy set to the input to regenerate the authorization decision set.

13. The computer-implemented method of claim 11, wherein the input comprises a set of subjects, a set of resources, a set of actions, an environment, and a context.

14. The computer-implemented method of claim 11, wherein the applying the stored authorization policy set to the input further comprises applying the stored authorization policy set to each subject of the input.

15. The computer-implemented method of claim 11, further comprising:

determining a set of subjects of the input that are affected by the modifications to the authorization policy set; and applying the modified authorization policy set to only the set of subjects to regenerate the authorization decision set.

16. An enterprise system, comprising:

an authorization module comprising instructions;

a memory configured to store the instructions of the authorization module;

a processor configured to execute the instructions of the authorization module stored on the memory; and a user provisioning system, wherein the processor is further configured, when executing the instructions of the authorization module stored on the memory, to, model an authorization policy set comprising one or more authorization policies, store the authorization policy set in a policy store, retrieve from an application an input of the application, wherein the input of the application comprises at least one of a subject, a resource, or an action, apply the stored authorization policy set to an input of an application to generate an authorization decision set independent of the application using an application programming interface of the policy store, wherein the authorization decision set comprises one or more authorization decisions, and store the authorization decision set in a decision table, and wherein the user provisioning system is configured to propagate the stored authorization decision set to the application;

wherein the processor is further configured, when executing the instructions of the authorization module stored on the memory, to, modify the authorization policy set; and apply the modified authorization policy set to the input to regenerate the authorization decision set.

17. The enterprise system of claim 16, wherein the user provisioning system is further configured to, convert authorization information of the application into a normalized form, compare the authorization decision set with the normalized authorization information of the application, and report a discrepancy between authorization information of the application and the authorization decision set, and wherein the processor is further configured, when executing the instructions of the authorization module stored on the memory, to, modify the authorization policy set based on the discrepancy, and apply the modified authorization policy set to the input to regenerate the authorization decision set.

18. The enterprise system of claim 16, wherein the input comprises a set of subjects, a set of resources, a set of actions, an environment, and a context.

19. The enterprise system of claim 16, wherein the processor is further configured, when executing the instructions of the authorization module stored on the memory, to apply the stored authorization policy set to each subject of the input.

20. The enterprise system of claim 16, wherein the processor is further configured, when executing the instructions of the authorization module stored on the memory, to, determine a set of subjects of the input that are affected by the modifications to the authorization policy set, and apply the modified authorization policy set to only the set of subjects to regenerate the authorization decision set.

* * * * *

UNITED STATES PATENT AND TRADEMARK OFFICE
CERTIFICATE OF CORRECTION

PATENT NO. : 8,789,132 B2  
APPLICATION NO. : 12/795263  
DATED : July 22, 2014  
INVENTOR(S) : Bregman et al.

It is certified that error appears in the above-identified patent and that said Letters Patent is hereby corrected as shown below:

On Title page 2, column 2, under Other Publications, line 15, delete "Manger"," and insert -- Manager", --, therefor.

In the Specification,

In column 5, line 65, delete "a an" and insert -- an --, therefor.

In column 10, line 6, delete "the a" and insert -- a --, therefor.

In column 13, line 26, delete ""BankMangers"" and insert -- "BankManagers" --, therefor.

Signed and Sealed this  
Twenty-fourth Day of February, 2015

Michelle K. Lee  
*Deputy Director of the United States Patent and Trademark Office*